United States Patent [19]

Urasaki

[11] Patent Number: 5,524,251
[45] Date of Patent: Jun. 4, 1996

[54] MICROCOMPUTER HAVING ALU PERFORMING MIN AND MAX OPERATIONS

[75] Inventor: Kazuaki Urasaki, Mukou, Japan

[73] Assignee: Omron Corporation, Kyoto, Japan

[21] Appl. No.: 548,571

[22] Filed: Jul. 5, 1990

[30] Foreign Application Priority Data

Jul. 12, 1989 [JP] Japan .................... 1-178100

[51] Int. Cl.⁶ .................................................. G06F 17/10
[52] U.S. Cl. .................... 395/800; 364/DIG. 1; 364/DIG. 2; 364/258
[58] Field of Search ................ 395/DIG. 1 MS Files, 395/DIG. 2 MS Files, 800, 3

[56] References Cited

U.S. PATENT DOCUMENTS 4,620,188  10/1986  Sengchanh ......................... 395/3

OTHER PUBLICATIONS

Labib Sultan, "A Formal Approach for the Organization and Implementation of Fuzzy Micro–Processor Module", Fuzzy Computing, Elsevier Science Publishers B.V., (1988) pp. 201–221.
Togai et al, "Expert System on a Chip: An Engine for Real–Time Approximate Reasoning," IEEE Expert (Fall 1986) pp. 55–62.
Takeshi Yamakawa, "Fuzzy Computing Theory, Hardware, And Applications," Fuzzy Computing Elsevier Science Publishers B.V. (1988) pp. 157–171.

"ALU Implementing Native Minimum/Maximum Function for Signal Processing Applications", IBM Technical Disclosure Bulletin, vol. 29, No. 5, (Oct. 1986) pp. 1975–1978.

*Primary Examiner*—Robert B. Harrell
*Attorney, Agent, or Firm*—Dickstein, Shapiro & Morin

[57] ABSTRACT

All data to be compared are stored in a register group (1) in advance. When a MIN operation is executed, a maximum value (e.g, FF) is initially set in a memory (2). Source data outputted by the register group (1) and destination data outputted by the memory (2) are applied to a full adder/subtractor (30) operating as a subtractor. The subtractor (30) outputs a borrow signal when an item of source data is smaller than an item of destination data. In response to the borrow signal, an AND gate (33) is enabled, so that the item of source data is written in the memory (2) as a new item of destination data. When an item of source data is equal to or greater than an item of destination data, the borrow signal is not delivered as an output, the AND gate (33) is disabled and a new item of data is not stored in the memory (2). The foregoing operation is repeated with regard to all data in the register group (1). Eventually, a state is attained in which the smallest item of data among the data in the register group (1) is stored in the memory (2).

In a MAX operation, a minimum value (e.g, OO) is set in the memory (2) as initial data. When the borrow signal is not outputted, the AND gate (33) is enabled. Eventually, a state is attained in which the largest item of data among the data in the register group (1) is stored in the memory (2).

11 Claims, 3 Drawing Sheets

MICROCOMPUTER HAVING ALU PERFORMING MIN AND MAX OPERATIONS

BACKGROUND OF THE INVENTION

1. Field of the Invention

This invention relates to a microcomputer and, more particularly, to a microcomputer capable of performing MIN and MAX operations.

2. Description of the Related Art

In fuzzy inferential reasoning and fuzzy control, MIN and MAX operations are often used. There are also instances where operations for fuzzy inferential reasoning and fuzzy control are executed using a device having a special-purpose architecture specifically for fuzzy operations, such as a fuzzy special-purpose coprocessor, IC chip or a read-only memory (ROM). In many applications, however, these operations are executed by a general-purpose binary microcomputer suitably programmed for fuzzy operations.

FIG. 3 illustrates the operation which takes place in a case where a MIN or MAX operation is executed by a general-purpose microcomputer. First, an instruction CMP for comparing source data and destination data is executed, then a conditional branch instruction Bcc conforming to a MIN or MAX operation is executed, and finally a transfer instruction MOVE for the compared data is executed.

Thus, with this method of executing MIN and MAX operations by the software of a general-purpose microcomputer, the three instructions CMP, Bcc and MOVE are necessary and these instructions must be executed in succession. A problem that results is low speed due to a slow-down in operation speed.

A problem encountered with a fuzzy special-purpose coprocessor is high cost, since 600,000 transistors, for example, are required. In addition, a fuzzy special-purpose IC chip or ROM is incapable of executing processing other than the intended fuzzy inferential reasoning. In particular, the rules and membership functions in fuzzy inferences cannot be changed in case of a ROM.

SUMMARY OF THE INVENTION

An object of the present invention is to provide a microcomputer capable of executing MIN and MAX operations at high speed.

A microcomputer according to the present invention has a circuit, which is provided in an arithmetic-logic unit (ALU), for comparing two items of data by a MIN operational instruction, selecting the smaller item of data and outputting the same.

Furthermore, a microcomputer according to the present invention has a circuit, which is provided in an ALU, for comparing two items of data by a MAX operational instruction, selecting the larger item of data and outputting the same.

In the present invention, a MIN operation or a MAX operation is performed by one MIN operational instruction or one MAX operational instruction. Accordingly, in comparison with performing a MIN or MAX operation by three instructions, as in the prior art, MIN and MAX operations for fuzzy inferential reasoning can be performed at higher speed.

The microcomputer according to the present invention includes subtracting means, provided with two items of data, for subtracting one item of data from the other and outputting a borrow signal if one item of data is smaller than the other, and a logic circuit for performing a predetermined logic operation between the borrow signal and at least either one of a signal representing a MIN operational instruction and a signal representing a MAX operational instruction.

The subtracting means is a full subtractor or a full adder/subtractor. The full adder/subtractor performs a subtracting operation in response to a subtraction instruction.

The microcomputer according to the present invention preferably includes an output control circuit for controlling output of the abovementioned one item of data in response to an output signal from the logic circuit. The output control circuit inhibits output of a signal representing the result of subtraction, which is outputted by the subtracting means, when output of the abovementioned one item of data is permitted. The output control circuit permits output of the one item of data, in response to output of the borrow signal, when the MIN operational instruction is applied, and permits output of the one item of data, in response to non-output of the borrow signal, when the MAX operational instruction is applied.

The microcomputer according to the present invention preferably further includes first memory means for storing the abovementioned one item of data, and second memory means for storing the abovementioned other item of data, with output data from the output control circuit being applied to the second memory means. Further, the microcomputer according to the present invention has initial setting means for storing all data to be compared in the first memory means in advance, and storing predetermined initial-value data in the second memory means in advance.

Subtracting means and memory means provided in the conventional general-purpose binary microcomputer can be utilized as the abovementioned subtracting means and first and second memory means, and the initial setting means can be implemented by a software program. Therefore, in accordance with the invention, a microcomputer capable of executing MIN and MAX operations at high speed is realized merely by making a small improvement in the architecture of the conventional general-purpose microcomputer. It goes without saying that this microcomputer is capable of possessing the functions of a conventional microcomputer for performing such arithmetic processing as addition and subtraction, logical operations such as AND, OR and NOT, jump processing, etc.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
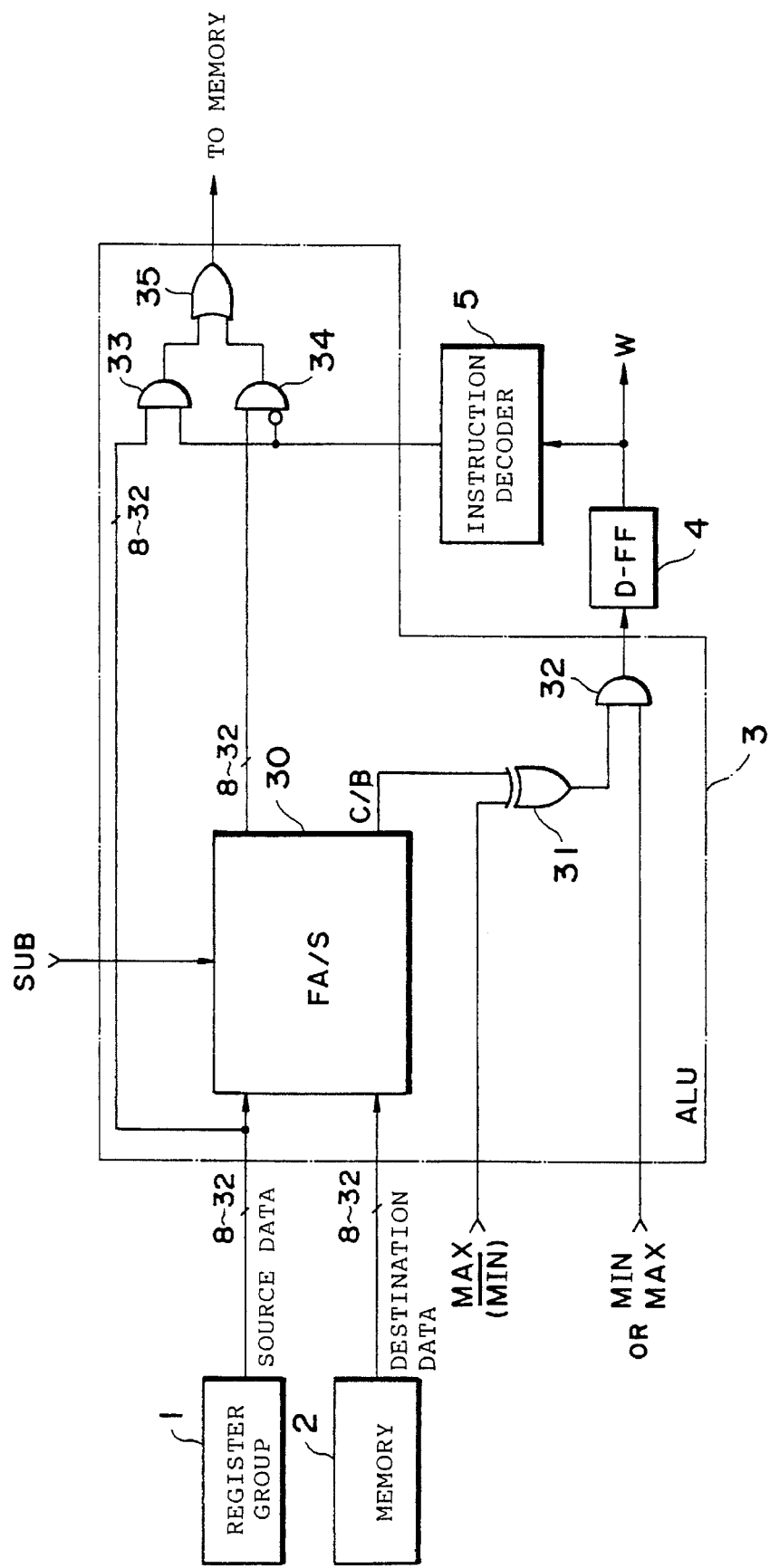
FIG. 1 is illustrative of an embodiment of the present invention and shows part of the constitution of an arithmetic-logic unit (ALU) as well as the peripheral circuitry thereof.

FIG. 1 illustrates part of the constitution of an arithmetic-logic unit (ALU) in a microcomputer according to the present invention, as well as the peripheral circuitry thereof.

A register group 1 includes a large number of registers. Let $x_1, x_2, \ldots, x_m$ represent data to which a MIN operation or MAX operation is to be applied. A MIN operation is one in which the smallest item of data is picked out from among the data $x_1$–$x_m$. A MAX operation is one in which the largest item of data is picked out from among the data $x_1$–$x_m$. These items of data $x_1, x_2, \ldots, x_m$ are stored beforehand in respective registers in the register group 1. These data $x_1$–$x_m$ are expressed by a prescribed number of bits among eight to 32 bits. It is permissible to store these data $x_1$–$x_m$ is a memory rather than the register group 1.

A memory 2 is for storing initial data, data representing the results of a MIN operation, or data representing the results of a MAX operation. A register can be used instead of the memory 2.

An ALU 3 includes a full adder/subtractor 30, logic circuitry and an output control circuit. The logic circuitry comprises an exclusive-OR (EX-OR) gate 31 and an AND gate 32, and the output control circuit comprises AND gates 33, 34 and an OR gate 35.

The full adder/subtractor 30 acts as a full subtractor when a subtraction instruction SUB is applied thereto. Data stored in any register in the register group 1 and data stored in memory 2 are applied to the full subtractor 30 as source data and destination data, respectively. The full subtractor 30 subtracts the destination data from the source data, outputs the results (8- to 32-bit data) of subtraction (data representing the results of subtraction are unnecessary in case of a MIN or MAX operation), and outputs a borrow signal B when the item of source data is smaller than the item of destination data. A signal represented by C is a carry signal outputted when the full adder/subtractor 30 operates as a full adder.

A signal representing a MIN operational instruction (this signal shall be referred to as a "MIN instruction signal" hereafter) attains a logic value "1" (H level) when a MIN operational instruction has been applied. A signal representing a MAX operational instruction (this signal shall be referred to as a "MAX instruction signal" hereafter) attains a logic value "1" (H level) when a MAX operational instruction has applied.

In the logic circuitry, the borrow signal B and a MAX instruction signal are applied to the EX-OR gate 31. This MAX instruction signal assumes a logic value "0" (L level) when the MIN operational instruction has been applied. It is permissible to apply an inverted signal $\overline{\text{MIN}}$ to the EX-OR gate 31 in place of the MAX instruction signal. This signal $\overline{\text{MIN}}$ assumes value "1" when the MAX operational instruction is applied and value "0" when the MIN operational instruction has been applied. Inputted to the AND gate 32 is the MIN instruction signal (when the MIN operational instruction has been applied) or the MAX instruction signal (when the MAX operational instruction has been applied).

The output signal of the AND gate 32 enters a D-type flip-flip 4. The latter is for delaying the output signal of the AND gate 32 by one clock period. The output of the D-type flip-flop 4 serves as a write signal W and is also applied to an instruction decoder 5. The memory 2 is incapable of reading and writing data at the same time. In order to write data in the memory 2 (referred to as a write cycle, which takes place only if the output of the AND gate 32 is "1") after readout of destination data from this memory 2 (referred to as a readout cycle), the delay of one clock period is applied to the output signal "1" of the AND gate 32 by the D-type flip-flop 4. If the memory 2 has the ability to read and write data simultaneously, it will be possible to dispense with 5he D-type flip-flop 4.

The instruction decoder 5 is adapted to decode a program and output various operational instructions (instructions for a MAX operation, MIN operation, AND operation, OR operation, NOT operation, bit processing, decision processing, etc.). In FIG. 1, the instruction decoder 5 outputs a signal for controlling the output control circuit when an output signal from the D-type flip-flop 4 has been applied thereto. It is permissible to delete the instruction decoder 5 and apply the output of the D-type flip-flop 4 directly to the output control circuit, but such an arrangement will be possible solely with regard to the operation of the circuit shown in FIG. 1.

In the output control circuit, the source data outputted by the register group 1 are inputted to the AND gate 33, and the data representing the results of addition/subtraction performed by the full adder/subtractor 30 are inputted to the AND gate 34. The AND gate 33 is controlled by the output of the instruction decoder 5 (for the output of the D-type flip-flop 4), and the AND gate 34 is controlled by a signal obtained by inverting the output of the instruction decoder 5. Accordingly, in a case where the output signal of the instruction decoder 5 is "1", the source data are permitted to pass through the AND gate 33, and output of the data indicative of the results of addition/subtraction performed by the full adder/subtractor 30 is inhibited. The source data which have passed through the AND gate 33 are applied to the memory 2 via the OR gate 35.

The operation of the microcomputer shown in FIG. 1 will now be described.

(1) MIN Operation

The data $x_1$–$x_m$ are stored in the register group 1. The maximum value ("FF" in case of eight bits, and "FFFF" in case of 32 bits) is set as initial data in the memory 2. The subtraction instruction SUB is applied to the full adder/subtractor 30, the MIN instruction signal becomes "1", and the MAX instruction signal becomes "0" owing to the MIN operational instruction.

The first item of data $x_1$ from the register group 1 is applied as source data to the full subtractor 30, and the initial data from the memory 2 is applied as destination data to the full subtractor 30. Since the item of source data is smaller than the item of destination data, the borrow signal B takes on the value "1". Since the MAX instruction signal is "0", the output of the EX-OR gate 31 becomes "1", and so does the output signal of the AND gate 32. Accordingly, the write signal W is outputted by the D-type flip-flop 4 following a delay of one clock period, and the AND gate 33 is enabled by the output "1" of the instruction decoder 5, as a result of which the item of source data $x_1$ is written in the memory 2.

In the next read cycle, the second item of data $x_2$ is read out of the register group 1 and the item of data $x_1$ written previously is read out of the memory 2, and these items of data are applied to the full subtractor 30. If the inequality $x_2 < x_1$ holds, then, just as described above, the borrow signal B becomes "1" and the item of data $x_2$ is written in the memory 2 in the write cycle one clock period later.

If the relation $x_2 \geq x_1$ holds, the borrow signal B is "0", and therefore the outputs of the EX-OR gate 31 and AND gate 32 are both "0"; hence the write signal W is not delivered as an output. Further, the AND gate 33 is placed in the disabled state, so that the item of data $x_2$ is not outputted. Though the data representing the results of subtraction are outputted via the AND gate 34 and the OR gate 35, rewriting of the memory 2 does not take place because the write signal W is not outputted.

In the next read cycle, the third item of data $x_3$ is read out of the register group 1 and the same comparison operation is performed.

Thus, in a case where an item of source data is smaller than an item of destination data, the item of source data is written in the memory 2. If an item of source data is not smaller than an item of destination data (i.e., if the former equal to or greater than the latter), rewriting of the memory 2 does not take place. As a result, when processing regarding the last item of source data $x_m$ ends, the smallest item of data among the data $x_1$–$x_m$ will be stored in the memory 2.

Accordingly, the microcomputer of this embodiment is capable of obtaining source data smaller than destination data by single MIN operational instruction, and is capable of obtaining the minimum value of the source data by repeating execution of the MIN operational instruction.

(2) MAX Operation

The data $x_1$–$x_m$ are stored in the register group 1. The minimum value ("OO" in case of eight bits, and "OOOO" in case of 32 bits) is set as initial data in the memory 2. The subtraction instruction SUB is applied to the full adder/subtractor 30, the MAX instruction signal becomes "1" and the MIN instruction signal becomes "0" owing to the MAX operational instruction.

The first item of data $x_1$ from the register group 1 is applied as source data to the full subtractor 30, and the initial data from the memory 2 is applied as destination data to the full subtractor 30. Since the item of source data is larger than the item of destination data, the borrow signal B takes on the value "0". Since the MAX instruction signal is "1", the output of the EX-OR gate 31 becomes "1", and so does the output signal of the AND gate 32. Accordingly, the write signal W is outputted by the D-type flip-flop 4 following a delay of one clock period, and the AND gate 33 is enabled by the output "1" of the instruction decoder 5, as a result of which the item of source data $x_1$ is written in the memory 2.

In the next read cycle, the second item of data $x_2$ is read out of the register group 1 and the item of data $x_1$ written previously is read out of the memory 2, and these items of data are applied to the full subtractor 30. If the relation $x_2 \geq x_1$ holds, then, just as described above, the borrow signal becomes "0" and the item of data $x_2$ is written in the memory 2 in the write cycle one clock period later.

If the inequality $x_2 < x_1$ holds, the borrow signal is "1", and therefore the outputs of the EX-OR gate 31 and AND gate 32 are both "0"; hence the write signal W is not delivered as an output. Further, the AND gate 33 is placed in the disabled state, so that the item of data $x_2$ is not outputted. Though the data representing the results of subtraction are outputted via the AND gate 34 and the OR gate 35, rewriting of the memory 2 does not take place because the write signal W is not outputted.

In the next read cycle, the third item of data $x_3$ is read out of the register group 1 and the same comparison operation is performed.

Thus, in a case where an item of source data is equal to or larger than an item of destination data, the item of source data is written in the memory 2. If an item of source data is smaller than an item of destination data, rewriting of the memory 2 does not take place. As a result, when processing regarding the last item of source data $x_m$ ends, the largest item of data among the data $x_1$–$x_m$ will be stored in the memory 2.

Accordingly, the microcomputer of this embodiment is capable of obtaining source data equal to or greater than destination data by single MAX operational instruction, and is capable of obtaining the maximum value of the source data by repeating execution of the MAX operational instruction.

Figure 2:
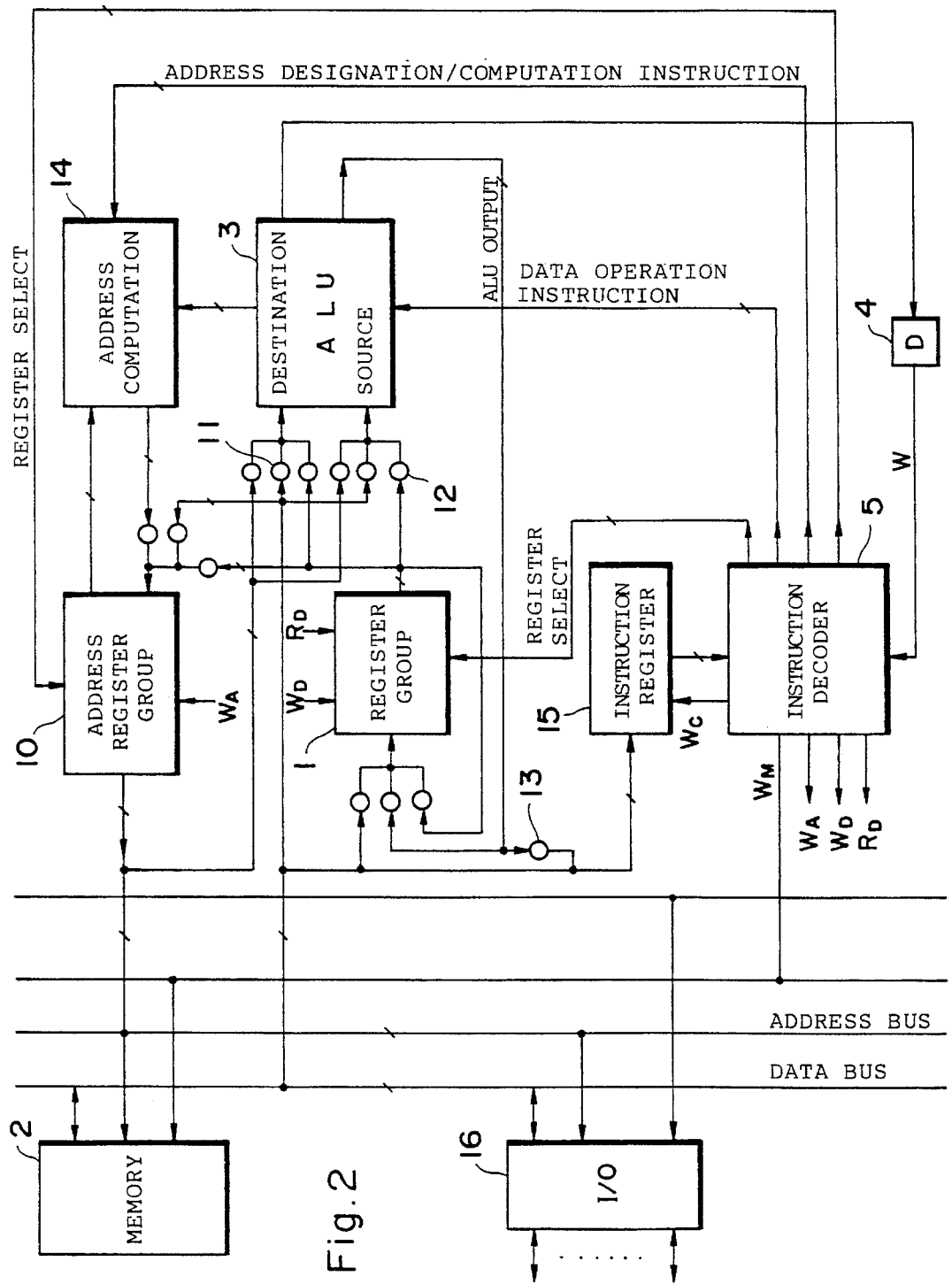
FIG. 2 is a circuit diagram showing the overall construction of a microcomputer.
Figure 3:
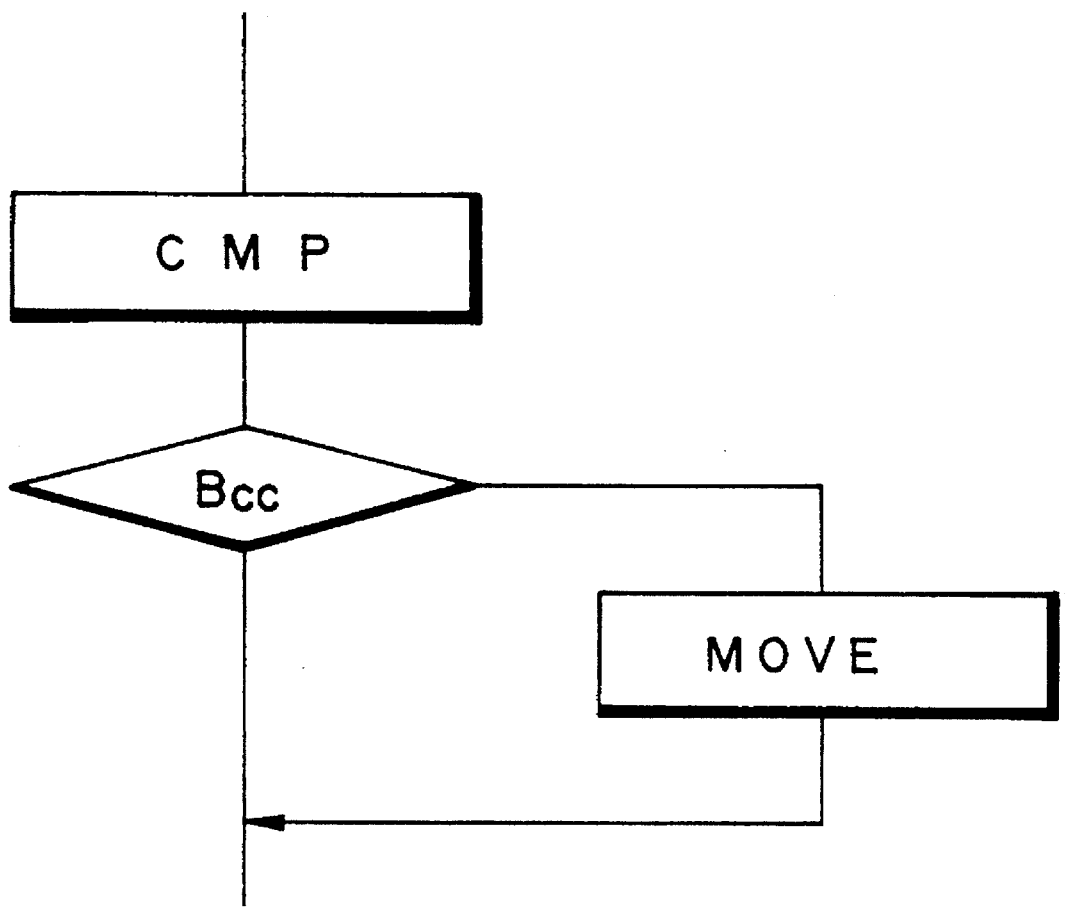
FIG. 3 is a flowchart showing procedure for performing MIN and MAX operations using a general-purpose microcomputer.

FIG. 2 illustrates the overall construction of the microcomputer. The circuitry of FIG. 1 is included in FIG. 2. Accordingly, portions in FIG. 2 that are the same as those in FIG. 1 are designated by like reference characters.

The ALU 3 performs, in addition to the MIN and MAX operations described above, arithmetic operations such as addition and subtraction, logic operations such as AND, OR and NOT, as well as bit processing and decision processing. Instructions for performing these various types of processing are applied to the ALU 3 from the instruction decoder 5. The output (the write signal w) of the D-type flip-flop also is applied to the instruction decoder 5, and a memory-write signal $W_M$ from the instruction decoder 5 is applied to the memory 2.

The memory 2 includes a RAM and a ROM. The RAM stores various data (which includes destination data). The ROM stores a program, and the program and data read out of the ROM are applied to the instruction decoder 5. The write and read addresses of the memory 2 are designated by data that have been stored in a register within an address register group 10. The address is computed by an address computing circuit 14. A register selection signal and an address register group write signal $W_A$ from the instruction decoder 5 are applied to the address register group 10. An address designating/computing instruction is applied to the address computing circuit 14 from the instruction decoder 5.

The source data $x_1$–$x_m$ are read out of the memory 2 and written in the register group 1 via a data bus. The registers in the register group 1 are designated by the register selection signal outputted by the instruction decoder 5. The writing and reading of data to and from the designated register is controlled by a data register group write signal $W_D$ and read signal $R_D$, respectively. These control signals $W_D$, $R_D$ are also outputted by the instruction decoder 5.

The source data read out of the register group 1 are applied to the ALU 3 via a gate 12. The destination data read out of the memory 2 are applied to the ALU 3 via a gate 11. The source data outputted by the ALU 3 are written in the memory 2 via a gate 13 and the data bus.

Also shown in FIG. 2 are an instruction register 15 and an input/output unit 16, etc.

As many apparently widely different embodiments of the present invention can be made without departing from the spirit and scope thereof, it is to be understood that the invention is not limited to the specific embodiments thereof except as defined in the appended claims.

What is claimed is:

1. A general purpose binary microcomputer comprising:
   means for outputting one of a MIN operational instruction and a MAX operational instruction;
   an arithmetic logic unit (ALU) capable of performing addition, subtraction, multiplication and division operations and MIN and MAX operations, said arithmetic logic unit receiving said one of a MIN and MAX operational instruction and:
   (a) in response to a MIN operational instruction comparing plural items of data and selecting whichever of the plural items of data is smallest,
   (b) in response to a MAX operational instruction comparing plural items of data and selecting whichever of the plural items of data is largest.

2. A microcomputer as in claim 1 wherein said arithmetic logic unit comprises:

subtracting means to which two items of data are applied for subtracting from one item of data, another item of data and outputting a borrow signal if said one item of data is smaller than said other item of data, and a logic circuit for performing a predetermined logic operation between the borrow signal and a signal representing one of a MIN operational instruction and a MAX operational instruction.

3. The microcomputer according to claim 2, wherein said arithmetic logic unit further comprises an output control circuit for controlling an output of a selected one of said two items of data in response to an output signal from said logic circuit.

4. The microcomputer according to claim 3, further comprising:

first memory means for storing said one item of data; and second memory means for storing said other item of data;

said output from said output control circuit being applied to said second memory means.

5. The microcomputer according to claim 4, further comprising initial setting means for storing a plurality of data which is to be selectively applied to said subtracting means as said one item of data to be compared in said first memory means in advance, and storing a predetermined initial-value data in said second memory means in advance.

6. The microcomputer according to claim 3, wherein said output control circuit inhibits output of a signal representing a result of subtraction, which is outputted by said subtracting means, when output of said selected item of data is permitted.

7. The microcomputer according to claim 3, wherein said output control circuit permits output of said selected item of data, in response to output of the borrow signal, when the MIN operational instruction has been applied, and permits output of said selected item of data, in response to non-output of the borrow signal, when the MAX operational instruction has been applied.

8. The microcomputer according to claim 2, wherein said subtracting means is a full subtractor.

9. The microcomputer according to claim 2, wherein said subtracting means is a full adder/subtractor, and said full adder/subtractor performs a subtracting operation in response to a subtraction instruction.

10. The microcomputer according to claim 1 wherein said outputting means outputs a MIN operational instruction.

11. The microcomputer according to claim 1 wherein said outputting means outputs a MAX operational instruction.

* * * * *

(12) EX PARTE REEXAMINATION CERTIFICATE (9010th)
United States Patent
Urasaki

(10) Number: US 5,524,251 C1
(45) Certificate Issued: May 15, 2012

(54) MICROCOMPUTER HAVING ALU PERFORMING MIN AND MAX OPERATIONS

(75) Inventor: Kazuaki Urasaki, Mukou (JP)

(73) Assignee: Detelle Relay KG, Limited Liability Company, Wilmington, DE (US)

Reexamination Request:
No. 90/011,510, Mar. 22, 2011

Reexamination Certificate for:
Patent No.: 5,524,251
Issued: Jun. 4, 1996
Appl. No.: 07/548,571
Filed: Jul. 5, 1990

(51) Int. Cl.
*G06F 17/18* (2006.01)
*G06F 9/30* (2006.01)
*G06F 9/302* (2006.01)

(52) U.S. Cl. .............. 712/36; 712/E9.017; 712/E9.02; 708/207

(58) Field of Classification Search .............. 395/800
See application file for complete search history.

(56) References Cited

To view the complete listing of prior art documents cited during the proceeding for Reexamination Control Number 90/011,510, please refer to the USPTO's public Patent Application Information Retrieval (PAIR) system under the Display References tab.

*Primary Examiner* — Adam Basehoar

(57) ABSTRACT

All data to be compared are stored in a register group (1) in advance. When a MIN operation is executed, a maximum value (e.g, FF) is initially set in a memory (2). Source data outputted by the register group (1) and destination data outputted by the memory (2) are applied to a full adder/subtractor (30) operating as a subtractor. The subtractor (30) outputs a borrow signal when an item of source data is smaller than an item of destination data. In response to the borrow signal, an AND gate (33) is enabled, so that the item of source data is written in the memory (2) as a new item of destination data. When an item of source data is equal to or greater than an item of destination data, the borrow signal is not delivered as an output, the AND gate (33) is disabled and a new item of data is not stored in the memory (2). The foregoing operation is repeated with regard to all data in the register group (1). Eventually, a state is attained in which the smallest item of data among the data in the register group (1) is stored in the memory (2).

In a MAX operation, a minimum value (e.g, OO) is set in the memory (2) as initial data. When the borrow signal is not outputted, the AND gate (33) is enabled. Eventually, a state is attained in which the largest item of data among the data in the register group (1) is stored in the memory (2).

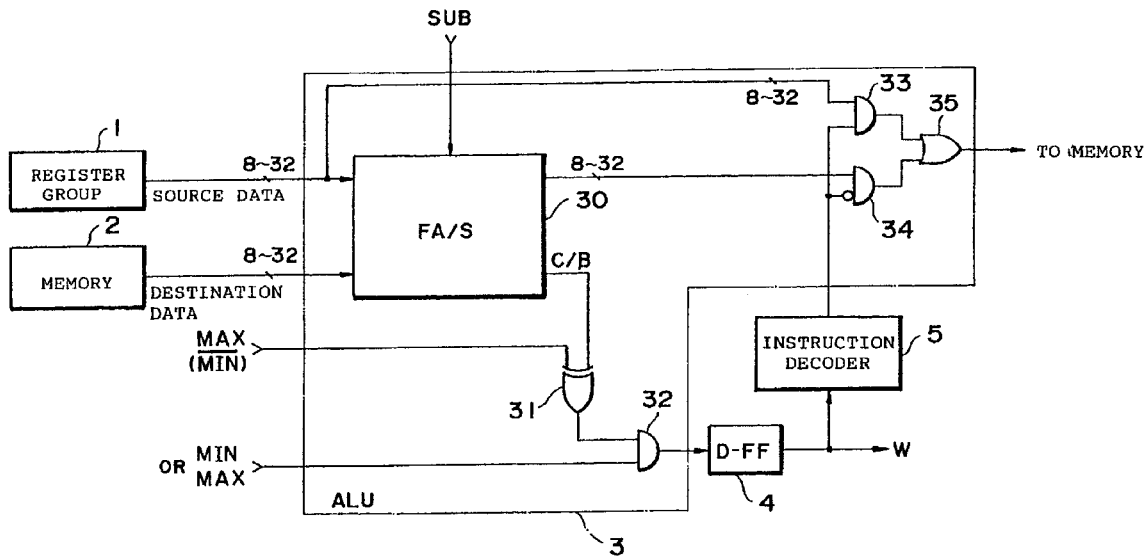

US 5,524,251 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 10 and 11 are cancelled.

Claim 2 is determined to be patentable as amended.

Claims 3-9, dependent on an amended claim, are determined to be patentable.

New claims 12-19 are added and determined to be patentable.

2. [A microcomputer as in claim 1] *A general purpose binary microcomputer comprising:*
   *means for outputting one of a MIN operational instruction and a MAX operational instruction;*
   *an arithmetic logic unit (ALU) capable of performing addition, subtraction, multiplication and division operations and MIN and MAX operations, said arithmetic logic unit receiving said one of a MIN and MAX operational instruction and:*
   *(a) in response to a MIN operational instruction comparing plural items of data and selecting whichever of the plural items of data is smallest,*
   *(b) in response to a MAX operational instruction comparing plural items of data and selecting whichever of the plural items of data is largest,* wherein said arithmetic logic unit comprises:
      subtracting means to which two items of data are applied for subtracting from one item of data, another item of data and outputting a borrow signal if said one item of data is smaller than said other item of data, and
      a logic circuit for performing a predetermined logic operation between the borrow signal and a signal representing one of a MIN operational instruction and a MAX operational instruction.

*12. A general purpose binary microcomputer comprising:*
   *means for outputting one of a MIN operational instruction and a MAX operational instruction;*
   *an arithmetic logic unit (ALU) capable of performing addition, subtraction, multiplication and division operations and MIN and MAX operations;*
   *a first memory coupled to said ALU configured to store a plurality of data items;*
   *a second memory coupled to said ALU configured to store a destination data item;*
   *wherein said arithmetic logic unit is configured to receive said one of a MIN and MAX operational instruction and:*
      *(a) in response to a MIN operational instruction comparing plural items of data and selecting whichever of the plural items of data is smallest, further comprising:*
         *in response to a single MIN operational instruction, sequentially performing a comparison operation between each data item in said plurality of data items and said destination data item stored in said second memory, and*
         *wherein upon completion of each comparison operation, and prior to a subsequent comparison operation, in response to said compared data item being smaller than said destination data, replacing said destination data item stored in said second memory with said compared data item,*
      *(b) in response to a MAX operational instruction comparing plural items of data and selecting whichever of the plural items of data is largest.*

*13. A general purpose binary microcomputer comprising:*
   *means for outputting one of a MIN operational instruction and a MAX operational instruction;*
   *an arithmetic logic unit (ALU) capable of performing addition, subtraction, multiplication and division operations and MIN and MAX operations, said arithmetic logic unit receiving said one of a MIN and MAX operational instruction:*
      *(a) in response to a MIN operational instruction comparing plural items of data and selecting whichever of the plural items of data is smallest,*
      *(b) in response to a MAX operational instruction comparing plural items of data and selecting whichever of the plural items of data is largest, further comprising:*
         *in response to a single MAX operational instruction, sequentially performing a comparison operation between each data item in said plurality of data items and said destination data item stored in said second memory, and*
         *wherein upon completion of each comparison operation, and prior to a subsequent comparison operation, in response to said compared data item being larger than said destination data, replacing said destination data item stored in said second memory with said compared data item;*
   *a first memory coupled to said ALU configured to store a plurality of data items; and*
   *a second memory coupled to said ALU configured to store a destination data item.*

*14. A general purpose binary microcomputer comprising:*
   *means for out-putting one of a MIN operational instruction and a MAX operational instruction;*
   *an arithmetic logic unit (ALU) capable of performing addition, subtraction, multiplication, and division operations and MIN and MAX operations;*
   *a first memory coupled to said ALU configured to store a plurality of data items; and*
   *a second memory coupled to said ALU configured to store a destination data item,*
   *wherein said arithmetic logic unit is configured to receive said one of a MIN and MAX operation instruction and:*
      *(a) in response to a MIN operational instruction comparing plural items of data and selecting whichever of the plural items of data is smallest,*
      *(b) in response to a MAX operational instruction comparing plural items of data and selecting whichever of the plural items of data is largest;*
   *wherein said destination data item is initialized as a maximum supported value in response to MIN operational instruction being received by the ALU.*

15. A general purpose binary microcomputer comprising:
means for outputting one of a MIN operational instruction and a MAX operational instruction;
an arithmetic logic unit (ALU) capable of performing addition, subtraction, multiplication and division operations and MIN and MAX operations,
a first memory coupled to said ALU configured to store a plurality of data items; and
a second memory coupled to said ALU configured to store a destination data item,
wherein said arithmetic logic unit is configured to receive said one of a MIN and MAX operational instruction and:
  (a) in response to a MIN operational instruction comparing plural items of data and selecting whichever of the plural items is smallest;
  (b) in response to a MAX operational instruction comparing plural items of data and selecting whichever of the plural items of data is largest;
wherein said destination data item is initialized as a minimum supported value in response to a MAX operational instruction being received by the ALU.

16. The microcomputer according to claim 14, wherein a response to a MIN operational instruction comparing plural items of data and selecting whichever of the plural items is smallest comprises:
  in response to a single operational instruction,
    comparing a first data item in said plurality of data items to said destination data item stored in said second memory,
  in response to said first data item in said plurality of data items being smaller than said destination data, replacing said initialized value of said destination data item stored in said second memory with said first data item,
    comparing a second data item in said plurality of data items to said destination data stored in said second memory, and
  in response to said second data item in said plurality of data items being smaller than said destination data, replacing said destination data item stored in said second memory with said second data item.

17. The microcomputer according to claim 15, wherein in response to a MAX operational instruction comparing plural items of data and selecting whichever of the plural items is largest comprises:
  in response to a single MAX operational instruction,
    comparing a first data item in said plurality of data items to said destination data item stored in said second memory,
  in response to said first data item in said plurality of data items being larger than said destination data, replacing said initialized value of said destination data item stored in said second memory in said first data item,
    comparing a second data items to said plurality of data items to said destination data stored in said second memory, and
  in response to said second data item in said plurality of items being larger than said destination data, replacing said destination data item stored in said second memory with said second data item.

18. A general purpose binary microcomputer comprising:
means for outputting one of a MIN operational instruction and a MAX operational instruction;
an arithmetic logic unit (ALU) capable of performing addition, subtraction, multiplication and division operations and MIN and MAX operations, said arithmetic logic unit receiving said one of a MIN and MAX operational instruction:
  (a) in response to a MIN operational instruction comparing items of data and selecting whichever of the plural items of data is smallest, further comprising;
    comparing at least three items of data and selecting a value equal to a smallest value of said three items of data; and
  (b) in response to a MAX operational instruction comparing plural items of data and selecting whichever of the plural items of data is largest.

19. A general purpose binary microcomputer comprising:
means for outputting one of a MIN operational instruction and a MAX operational instruction;
an arithmetic logic unit (ALU) capable of performing addition, subtraction, multiplication and division operations and MIN and MAX operations, said arithmetic logic unit receiving said one of a MIN and MAX operational instruction:
  (a) in response to a MIN operational instruction comparing plural items of data and selecting whichever of the plural items of data is smallest, and
  (b) in response to a MAX operational instruction comparing plural items of data and selecting whichever of the plural items of data is largest, further comprising:
    comparing at least three items of data and selecting a value equal to a largest value of said three items of data.

* * * * *